United States Patent [19]
Weltin et al.

[11] Patent Number: 5,236,186
[45] Date of Patent: Aug. 17, 1993

[54] VIBRATION DAMPER

[75] Inventors: Uwe Weltin, Rimbach; Hermann Schilling, Weinheim, both of Fed. Rep. of Germany

[73] Assignee: Firma Carl Freudenberg, Weinheim, Fed. Rep. of Germany

[21] Appl. No.: 979,748

[22] Filed: Nov. 23, 1992

[30] Foreign Application Priority Data

Nov. 22, 1991 [DE] Fed. Rep. of Germany ....... 4138405

[51] Int. Cl.$^5$ ............................................ F16F 15/03
[52] U.S. Cl. .............................. 267/140.15; 188/267; 188/378; 267/136; 248/550
[58] Field of Search .................. 267/136, 195, 140.11, 267/140.15, 219; 188/161, 163, 267, 378-380; 248/550, 636, 638, 559; 180/300, 312

[56] References Cited

U.S. PATENT DOCUMENTS

| | | | |
|---|---|---|---|
| 4,432,441 | 2/1984 | Kurokawa | 267/140.15 X |
| 4,699,348 | 10/1987 | Freudenberg | 267/140.15 X |
| 4,773,632 | 9/1988 | Härtel | 267/140.15 |
| 4,789,142 | 12/1988 | Hoying et al. | 267/140.15 |
| 5,042,786 | 8/1991 | Freudenberg et al. | 267/140.14 |

Primary Examiner—Douglas C. Butler
Attorney, Agent, or Firm—Kenyon & Kenyon

[57] ABSTRACT

A vibration damper comprising a magnet having a mass m and an elasticity $c_1$, and a spring element of flexibly compliant material having an elasticity $c_2$, wherein the magnet is mounted on the spring element so that the resiliency $c_1$ of the magnet and the resiliency $c_2$ of the spring element form an combined elasticity $c_{tot}$ of the vibration damper. The vibration damper is attached to a plate of magnetizable material which exhibits an interference frequency $\omega_1$ and is attracted to the magnet. The magnet is movable relative to said plate in every operating position. The mass m and elasticity $c_1$ of the magnet and the elasticity $c_2$ of the spring element are adjusted to achieve a natural frequency $\omega_0$ on the basis of the formula:

$$\omega_0 = \sqrt{\frac{c_{tot}}{m}}$$

so as to allow the resulting natural frequency $\omega_0$ to be adjusted in accordance with the interference frequency $\omega_1$ of the plate.

21 Claims, 4 Drawing Sheets

VIBRATION DAMPER

BACKGROUND OF THE INVENTION

The present invention relates generally to vibration dampers, and, more particularly, to an improved vibration damper with a small number of component parts. The vibration damper of the present invention comprises a magnet mounted on a spring element of flexibly compliant material and secured to a plate of magnetizable material, so that the mass of the magnet and the resilient properties of the magnet and the spring element can be selected in accordance with the vibration frequency of the plate. The magnet is movable relative to the plate in every operating state.

German Patent Document DE 39 18 753 discloses a similar damper. This document corresponds to U.S. Pat. No. 5,042,786, issued Aug. 27, 1991, which is hereby incorporated by reference into this specification. The rubber mounting described therein hydraulically damps developing vibrations by using a plate of magnetizable material. This plate is supported by a spring and bounds the area of a liquid-filled working chamber. The magnetizable plate is shifted back and forth, in accordance with specified parameters, by a magnetic system consisting of an electromagnet and a permanent magnet.

The rubber mounting of U.S. Pat. No. 5,042,786 permits effective damping of high frequency vibrations; however, the damper consists of many component parts, which increase cost, take up space, and require assembly. Therefore, that damper is somewhat unsatisfactory from an economic standpoint, and it is predominantly used when sufficient space is available for installation.

SUMMARY OF THE INVENTION

The object of the present invention is to further develop such a vibration damper assembly so as to achieve a considerably simplified design with few component parts, as well as to attain an improved economic efficiency with clearly reduced space requirements. The damping of vibrations is not adversely affected by the reduction in parts.

The resiliency of the present vibration damper, and the ability of the magnet to move relative to the plate, is maintained in all operating modes.

The operability of the present vibration damper is achieved by selecting components with particular characteristics. The components of the damper of the present invention can be selected to achieve a desired natural frequency, chosen in accordance with the frequency of the part to be damped.

The vibration damper of the present invention may act as a dynamic vibration absorber. The natural frequency of the vibration damper can be selected to conform to the frequency of the plate.

According to an embodiment of the invention, the vibration damper can be constructed with a plate arranged between two magnets, which are disposed so that they are adjacent to the plate on opposite sides.

According to another embodiment of the invention, the magnet can comprise two magnetic coils, which are arranged concentrically to one another in a soft-magnetic coil brace and are able to be triggered independently of one another.

According to another embodiment, the magnet can be a permanent magnet. A very low natural frequency can be provided in this system as well, when the resilient characteristics of the magnetic force and of the spring element complement each other. A vibration damper designed in this manner can be adjusted to the conditions of the particular application; however, a disadvantage of this embodiment is that it is not possible during operation to have a variable frequency to damp variable vibrations. Depending upon the vibration to be damped, attachment of a supplemental mass to the permanent magnet may be necessary.

In an alternative embodiment of the present invention, the vibration damper acts as a vibration isolator. The natural frequency $\omega_0$ of the vibration damper can be selected to be lower by at least the factor $\sqrt{2}$ the frequency of the vibration to be damped. If the frequency of the dynamic alternating force to be damped is higher by at least the factor $\sqrt{2}$ the natural frequency of the damper system, then, with increasing frequency, the magnet moves only slightly. In this manner, the vibration damper of the present invention can operate within a large frequency range to reduce the vibrations of the component part to be damped.

DETAILED DESCRIPTION OF THE INVENTION

Figure 1:
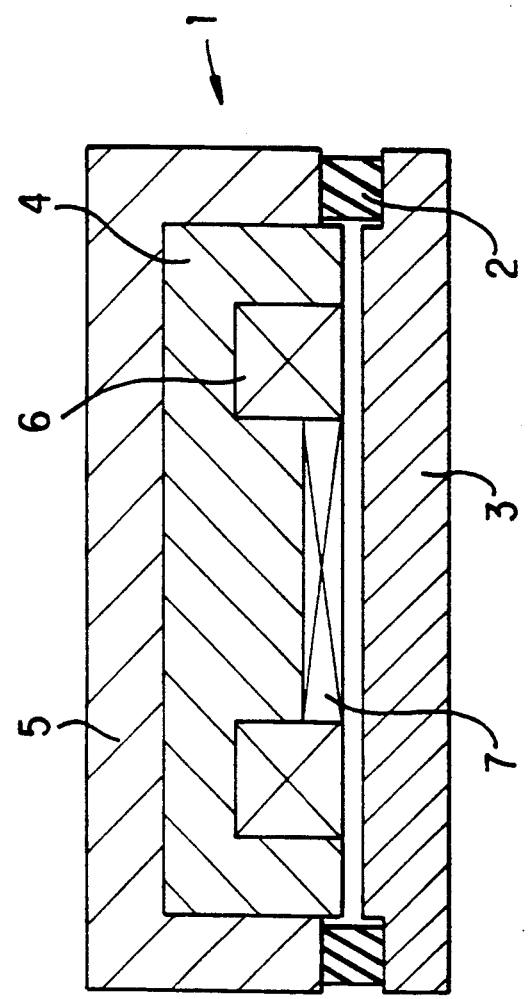
FIG. 1 shows an embodiment of a vibration damper according to the invention with the application of an electromagnet and a permanent magnet.

FIG. 1 depicts a vibration damper, comprising an magnet 1 consisting of a magnetic coil 6, a coil brace 4 of soft iron partially surrounding the magnetic coil 6, a permanent magnet 7, and a supplemental mass 5. The supplemental mass 5 and the coil brace 4 are rigidly attached to each other. A spring element 2 is made of flexibly compliant material and is arranged in this example between the supplemental mass 5 and a plate 3 made of magnetic material. The spring element 2 is pre-stressed, in compression, by the attractive force of the permanent magnet 7 on the plate 3, and the plate 3 is brought closer to the permanent magnet 7, leaving only a slight clearance. The magnetic coil 6 is able to receive an a.c. voltage, which is supplied to the vibration damper by a power supply unit (not shown) and which variably superimposes a dynamic flux on the static flux formed by the permanent magnet.

Defining the properties of the components, the magnet has an inertial mass m, and a resiliency $c_1$; the spring element has a resiliency $c_2$. The resiliencies of the magnet and the spring element complement one another, forming a resiliency $c_{tot}$ for the system.

The natural frequency $\omega_0$ of the vibration damper can be selected in accordance with the interference frequency $\omega_1$ of the plate. The inertial mass m of the magnet and the elastic properties of the magnet $c_1$ and the spring element $c_2$ can be selected on the basis of the formula:

$$\omega_0 = \sqrt{\frac{c_{tot}}{m}}$$

The vibration damper can be designed as a dynamic vibration absorber, so that the natural frequency $\omega_0$ of the vibration damper can be selected to conform to the interference frequency $\omega_1$ of the plate. In this manner, the vibrations can be effectively absorbed.

The magnet of FIG. 1 comprises an electromagnet, with magnetic coil 6 and coil brace 4, whereby the magnetic coil 6 is arranged in a slot of the coil brace 4 that is open toward the plate 3. The way the magnet 1 is combined with the spring element 2 causes the spring resilience to act in a direction opposite that of the magnetic force. The electromagnet exerts an attractive force on the plate 3, which is counteracted by the force of the spring element 2 under compression.

The elasticity of the vibration damper system of the present invention has a value at the static equilibrium point which, in connection with the magnet mass and supplemental mass, forms a natural frequency that lies in the range of the interference frequency to be damped. By modifying the current intensity and thus the magnetic force, the quenching frequency of the dynamic vibration absorber can be controlled. As a result, vibration damping through dynamic vibration absorption is achieved in a broad frequency range.

In the embodiment shown in FIG. 1, the permanent magnet 7 is attached to the magnetic coil 6, so that the magnetic coil 6 and the permanent magnet 7 are immovable relative to one another and are rigidly attached to the coil brace 4. The spring element 2 is brought into compression by the attraction of the permanent magnet 7 to the plate 3. To damp acoustically effective vibrations, the magnet 1 is set into a back and forth relative motion by operation of the electromagnet. The electromagnet is provided with connecting terminals (not shown), which can receive an a.c. voltage to activate the magnetic coil 6.

During normal operation, the permanent magnet 7 produces a static flux over the gap between the magnet 1 and the plate 3. The static attraction causes the spring element 2 to compress. The magnetic coil 6 superimposes a variable flux on the static flux, so that an alternating component of force is created. As a result, the magnet travels out of its position of equilibrium and is actuated. The a.c. voltage required for actuation is fed to the magnetic coil 6 from a power supply unit (not shown), which is controlled, for example, with the help of sensors in accordance with the vibrations to be damped.

The application of this type of vibration damper is particularly advantageous when the vibration damping takes place on predominantly metallic structures, and the vibration damper does not lie in the magnetic flux of the part being damped, so that it acts as a dynamic vibration absorber in accordance with its mass and natural frequency. Such metallic structures have a multitude of modes of vibration with different natural frequencies, which are excited by alternating forces and lead to disturbing vibrations and/or noises. The vibration damper according to the invention renders possible vibration damping in a broad frequency range.

Figure 2:
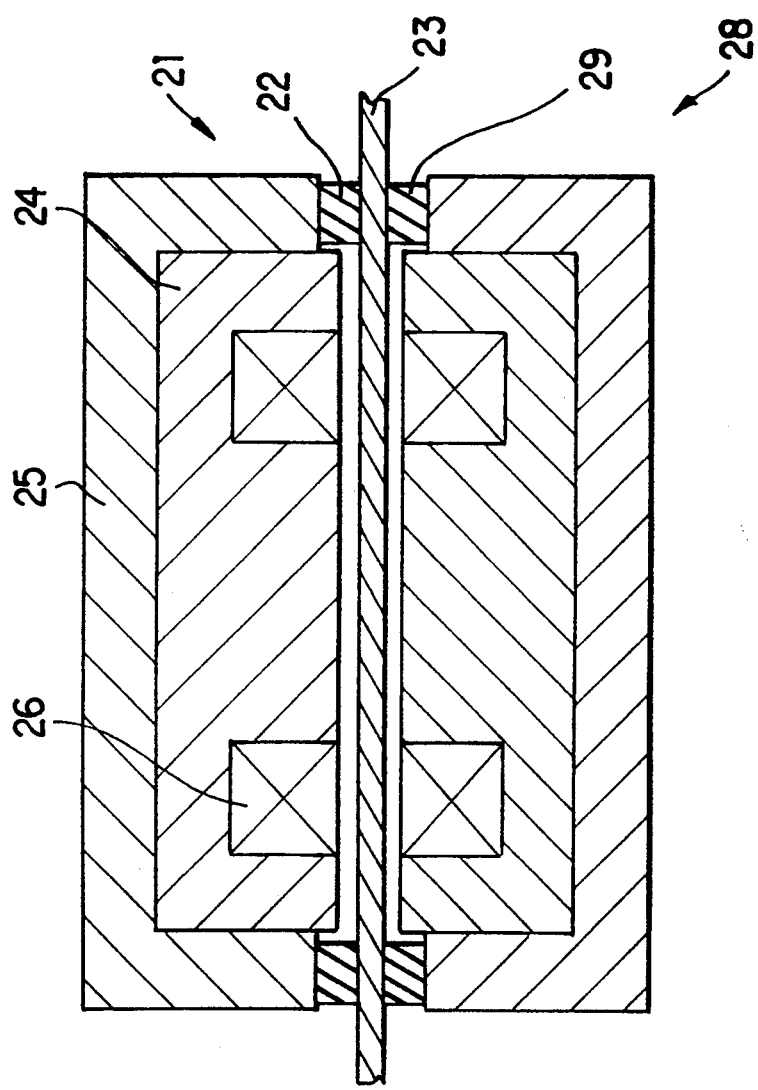
FIG. 2 shows a second embodiment of a vibration damper according to the invention, comprising two electromagnets, which are separated into two symmetrical halves.

In some applications, such as that shown in FIG. 2, a separate magnetic plate will be unnecessary, as the part to be damped itself serves as the plate providing the magnetic attraction for operation of the damper. The magnetic force is dependent on the gap between the magnet and the part to which it is attracted.

FIG. 2 shows a vibration damper, comprising magnets 21 and 28. Magnet 21 has a coil brace 24 and an electromagnetic coil 26. A supplemental mass 25 is attached. Magnet 28 is of similar construction to magnet 21. Spring elements 22, 29 are located between the respective magnets 21, 28 and the magnetic component part 23. The advantage of an additional magnet is that, depending upon the particular application, one can attain a broader range of damping vibrations. The two magnets 21, 28, which are arranged on both sides of the magnetic component part 23, can receive a.c. currents of varying frequency, for example, from separate power supply units (not shown).

Figure 3:
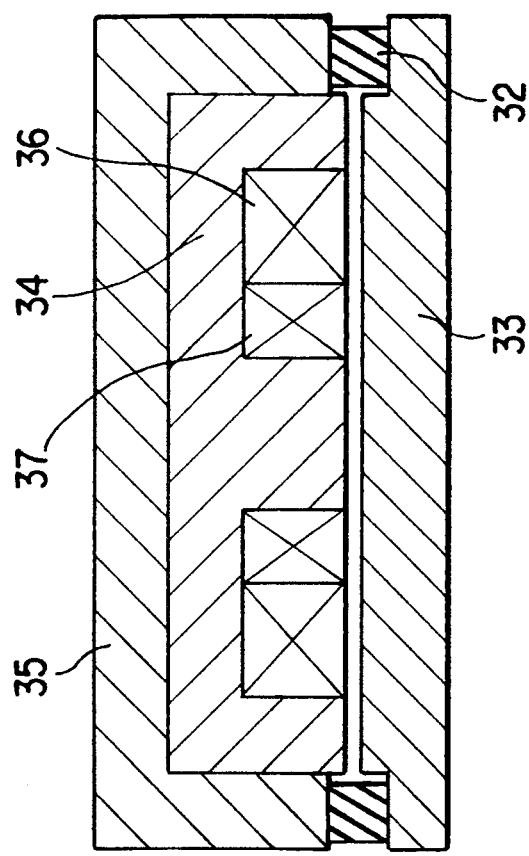
FIG. 3 shows a third embodiment of a vibration damper according to the invention, comprising an electromagnet with two coil forms, whereby one of the coil forms generates a static force and the other generates a dynamic force.

FIG. 3 illustrates a vibration damper comprising two magnetic coils 36, 37, which act in cooperation with plate 33, spring element 32, and supplemental mass 35. The coils 36, 37 surround one another concentrically and are able to be triggered independently of one another. The coils are arranged together in a coil brace 34. One of the magnetic coils 36 is provided to produce the static force; the other magnetic coil 37 generates the dynamic forces. As a result, the vibration damper of FIG. 3 can adjust extremely well to the conditions of the particular application. If the rigidity of the spring element 32 diminishes over time, the static force can be adjusted accordingly, by magnetic coil 36, with relative ease.

Figure 4:
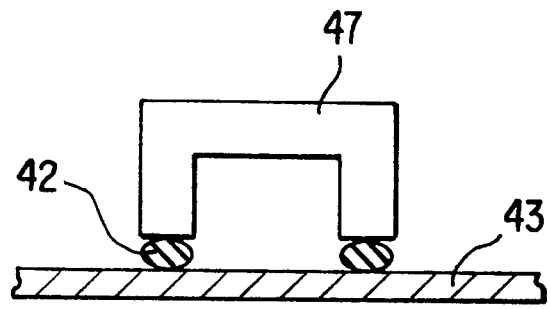
FIG. 4 shows a fourth embodiment of a vibration damper according to the invention, comprising a permanent magnet.

In FIG. 4, the magnet is designed as a permanent magnet 47 and forms the mass of the dynamic vibration damper. The permanent magnet 47 is attached to the part 43 to be damped, thus eliminating the need for a separate plate. An O-ring 42 is provided as a spring element.

As shown by the embodiment of FIG. 4, one of the advantages of the vibration damper of the present invention is that it consists of only a few components. It may be constructed from as few as two parts, one magnet and one spring element that supports the magnet.

Another advantage of the current invention is its low cost. For example, the spring element can consist of an elastomer spring that is essentially subjected to compressive stress, such as an O-ring, which is an inexpensive component part. O-rings can be obtained commercially in a wide range of dimensions.

The vibration damper of FIG. 4 can be designed to act as a vibration isolator. The natural frequency $\omega_0$ of the vibration damper can be selected to be lower by at least the factor $\sqrt{2}$ than the frequency of the vibration to be damped, and the characteristics of the components can be chosen according to the formula mentioned above. If the frequency of the dynamic alternating force to be damped is higher by at least the factor $\sqrt{2}$ than the natural frequency of the damper system, then, with increasing frequency, less force is transmitted to the magnet 47. Thus, the magnet 47 moves only slightly. Therefore, the vibration damper of the present invention can operate within a large frequency range.

Figure 5:
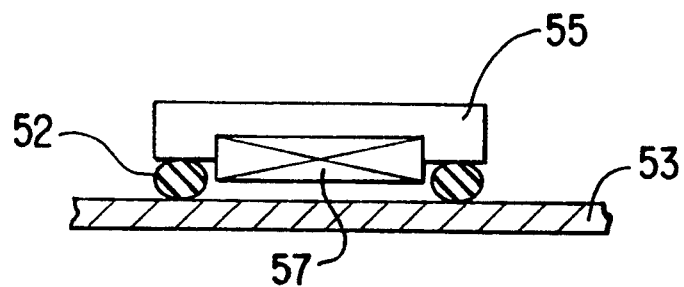
FIG. 5 shows a fifth embodiment of a vibration damper according to the invention, comprising a permanent magnet and a supplemental mass.

In FIG. 5, a supplemental mass 55 is provided to achieve the desired natural frequency, selected in accordance with the frequency of the part 53 to be damped. The supplemental mass 55 is rigidly attached to a permanent magnet 57. An O-ring is provided as a spring element 52.

Figure 6:
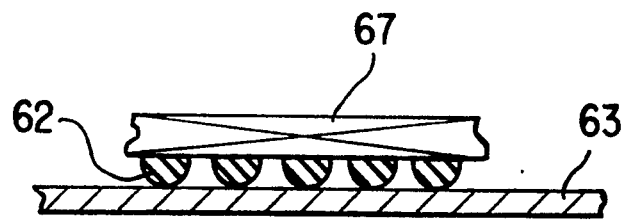
FIG. 6 shows a sixth embodiment of a vibration damper according to the invention, comprising a permanent magnet and hemispherical spring elements.

In FIG. 6, an alternative permanent magnet 67 is shown, and the spring element 62 is comprised of several hemispherical rubber nubs, separating the magnet 67 from the part 63 to be damped.

What is claimed is:

1. A vibration damper comprising a first magnet having a mass m and an elasticity $c_1$, and a spring element of flexibly compliant material having an elasticity $c_2$, wherein said first magnet is mounted on said spring element so that the elasticity $c_1$ of said first magnet and the elasticity $c_2$ of said spring element form an elasticity $c_{tot}$ of said vibration damper, and wherein said vibration damper is attached to a plate of magnetizable material which exhibits an interference frequency $\omega_1$ and is attracted to said first magnet, said first magnet is movable relative to said plate in every operating position, and wherein said mass m and said elasticity $c_1$ of said first magnet and said elasticity $c_2$ of said spring element are adjusted to achieve a natural frequency $\omega_0$ on the basis of the formula:

$$\omega_0 = \sqrt{\frac{c_{tot}}{m}}$$

so as to allow the resulting natural frequency $\omega_0$ to be adjusted in accordance with the interference frequency $\omega_1$ of the plate.

2. The vibration damper according to claim 1, wherein said first magnet comprises an electromagnet having at least a first magnetic coil and a coil brace of soft iron, and said first magnetic coil is arranged in a slot of said coil brace that is open toward said plate.

3. The vibration damper according to claim 2, wherein a supplemental mass is attached to said first magnet.

4. The vibration damper according to claim 2, wherein said spring element comprises an elastomeric material.

5. The vibration damper according to claim 2, wherein said first magnet also comprises a permanent magnet, so that said first magnetic coil and said permanent magnet are immovable relative to one another and are rigidly attached to said coil brace.

6. The vibration damper according to claim 2, wherein an additional magnet is arranged on an opposite side of said plate from said first magnet.

7. The vibration damper according to claim 2, wherein said first magnet comprises a second magnetic coil which is arranged concentrically to said first magnetic coil in said coil brace, and is able to be triggered independently of said first magnetic coil.

8. The vibration damper according to claim 1, wherein said first magnet comprises a permanent magnet.

9. The vibration damper according to claim 8, wherein a supplemental mass is attached to said first magnet.

10. The vibration damper according to claim 8, wherein said spring element comprises an elastomeric material.

11. A vibration damper comprising a first magnet having a mass m and an elasticity $c_1$, and a spring element of flexibly compliant material having an elasticity $c_2$, wherein said first magnet is mounted on said spring element so that the elasticity $c_1$ of said first magnet and the elasticity $c_2$ of said spring element form an elasticity $c_{tot}$ of said vibration damper, and wherein said vibration damper is attached to a plate of magnetizable material which exhibits an interference frequency $\omega_1$ and is attracted to said first magnet, said first magnet is movable relative to said plate in every operating position, and wherein said mass m and said elasticity $c_1$ of said first magnet and said elasticity $c_2$ of said spring element are adjusted to achieve a natural frequency $\omega_0$ on the basis of the formula:

$$\omega_0 = \sqrt{\frac{c_{tot}}{m}}$$

so that the resulting natural frequency $\omega_0$ is substantially equal to the interference frequency $\omega_1$ of the plate, and the vibration damper acts as a dynamic vibration absorber.

12. The vibration damper according to claim 11, wherein said first magnet comprises an electromagnet having at least a first magnetic coil and a coil brace of soft iron, and said first magnetic coil is arranged in a slot of said coil brace that is open toward said plate.

13. The vibration damper according to claim 12, wherein a supplemental mass is attached to said first magnet.

14. The vibration damper according to claim 12, wherein said first magnet also comprises a permanent magnet, so that said first magnetic coil and said permanent magnet are immovable relative to one another and are rigidly attached to said coil brace.

15. The vibration damper according to claim 12, wherein an additional magnet is arranged on an opposite side of said plate from said first magnet.

16. The vibration damper according to claim 12, wherein said first magnet comprises a second magnetic coil which is arranged concentrically to said first magnetic coil in said coil brace, and is able to be triggered independently of said first magnetic coil.

17. The vibration damper according to claim 11, wherein said first magnet comprises a permanent magnet.

18. The vibration damper according to claim 17, wherein a supplemental mass is attached to said first magnet.

19. A vibration damper comprising a first magnet having a mass m and an elasticity $c_1$, and a spring element of flexibly compliant material having an elasticity $c_2$, wherein said first magnet is mounted on said spring element so that the elasticity $c_1$ of said first magnet and the elasticity $c_2$ of said spring element form an elasticity $c_{tot}$ of said vibration damper, and wherein said vibration damper is attached to a plate of magnetizable material which exhibits an interference frequency $\omega_1$ and is attracted to said first magnet, said first magnet is movable relative to said plate in every operating position, and wherein said mass m and said elasticity $c_1$ of said first magnet and said elasticity $c_2$ of said spring element are adjusted to achieve a natural frequency $\omega_0$ on the basis of the formula:

$$\omega_0 = \sqrt{\frac{c_{tot}}{m}}$$

so that the resulting natural frequency $\omega_0$ is lower by at least the factor $\sqrt{2}$ than the frequency of a vibration to be damped.

20. The vibration damper according to claim 19, wherein said first magnet comprises a permanent magnet.

21. A method of constructing a vibration damper comprising the steps of selecting a natural frequency $\omega_0$ in accordance with an interference frequency $\omega_1$ of a plate, and choosing a first magnet having a mass m and an elasticity $c_1$ and a spring element of flexibly compliant material having an elasticity $c_2$, wherein said first magnet is mounted on said spring element so that the elasticity $c_1$ of said first magnet and the elasticity $c_2$ of said spring element form an elasticity $c_{tot}$ of said vibration damper, on the basis of the formula:

$$\omega_0 = \sqrt{\frac{c_{tot}}{m}}$$

so that vibrations are effectively damped.

* * * * *